US009396180B1

(12) United States Patent
Salvador et al.

(10) Patent No.: US 9,396,180 B1
(45) Date of Patent: Jul. 19, 2016

(54) SYSTEM AND METHOD FOR ANALYZING VIDEO CONTENT AND PRESENTING INFORMATION CORRESPONDING TO VIDEO CONTENT TO USERS

(71) Applicant: Amazon Technologies, Inc., Reno, NV (US)

(72) Inventors: Stan Weidner Salvador, Tega Cay, SC (US); Jeffrey Penrod Adams, Tyngsborough, MA (US); Kenneth Paul Fishkin, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 359 days.

(21) Appl. No.: 13/752,832

(22) Filed: Jan. 29, 2013

(51) Int. Cl.
*G10L 21/00* (2013.01)
*G06F 17/28* (2006.01)

(52) U.S. Cl.
CPC ..................................... *G06F 17/28* (2013.01)

(58) Field of Classification Search
USPC .................. 704/231–257, 270–275
See application file for complete search history.

(56) References Cited

U.S. PATENT DOCUMENTS

| 6,925,197 | B2 * | 8/2005 | Dimitrova et al. | 382/118 |
| 2002/0194199 | A1 * | 12/2002 | Flank | 707/104.1 |
| 2007/0220045 | A1 * | 9/2007 | Morris et al. | 707/104.1 |
| 2007/0250901 | A1 * | 10/2007 | McIntire et al. | 725/146 |
| 2010/0131571 | A1 * | 5/2010 | Reuveni | 707/803 |
| 2014/0165105 | A1 * | 6/2014 | Mountain | H04N 21/42203 725/46 |

* cited by examiner

*Primary Examiner* — Jesse Pullias
(74) *Attorney, Agent, or Firm* — Seyfarth Shaw LLP; Ilan N. Barzilay; Joseph M. Walker

(57) ABSTRACT

A system and method for using speech recognition, natural language understanding, image processing, and facial recognition to automatically analyze the audio and video data of video content and generate enhanced data relating to the video content and characterize the aspects or events of the video content. The results of the analysis and characterization of the aspects of the video content may be used to annotate and enhance the video content to enhance a user's viewing experience by allowing the user to interact with the video content and presenting the user with information related to the video content.

26 Claims, 16 Drawing Sheets

SYSTEM AND METHOD FOR ANALYZING VIDEO CONTENT AND PRESENTING INFORMATION CORRESPONDING TO VIDEO CONTENT TO USERS

BACKGROUND

People are often interested in information about movies and other video content that are available for viewing. To an extent, information about a certain movie can be found on the Internet, for example, names of actors in the movie, biographies of those actors, and other information. However, most of the information available via the Internet is manually generated, which can be very labor intensive and can result in human errors and inconsistencies in the generation of such information.

BRIEF DESCRIPTION OF DRAWINGS

For a more complete understanding of the present disclosure, reference is now made to the following description taken in conjunction with the accompanying drawings.

DETAILED DESCRIPTION

Automatic speech recognition (ASR) techniques and natural language understanding (NLU) techniques alone or in combination with audio processing, signal processing, speaker identification techniques, image processing and facial recognition techniques may be used to automate the analysis and generation of data relating to video content. These techniques may be applied to enhance a user's experience when watching movies or similar content by providing secondary information regarding the video content that may be of interest to the user. For example, the processing techniques described below may be applied to identify an actor/actress who is speaking, actor/actress appearances, dialogue being spoken, soundtrack information, products and items displayed, actions being performed, scenes, frames, filming location, cast and character images and information, biographical information, quotations, and other information about the video content. The generation of such data through automated or semi-automated methods may reduce the amount of human labor required to create such data, increase the efficiency of generating such data, and enhance a user's enjoyment of the video content.

Figure 1:
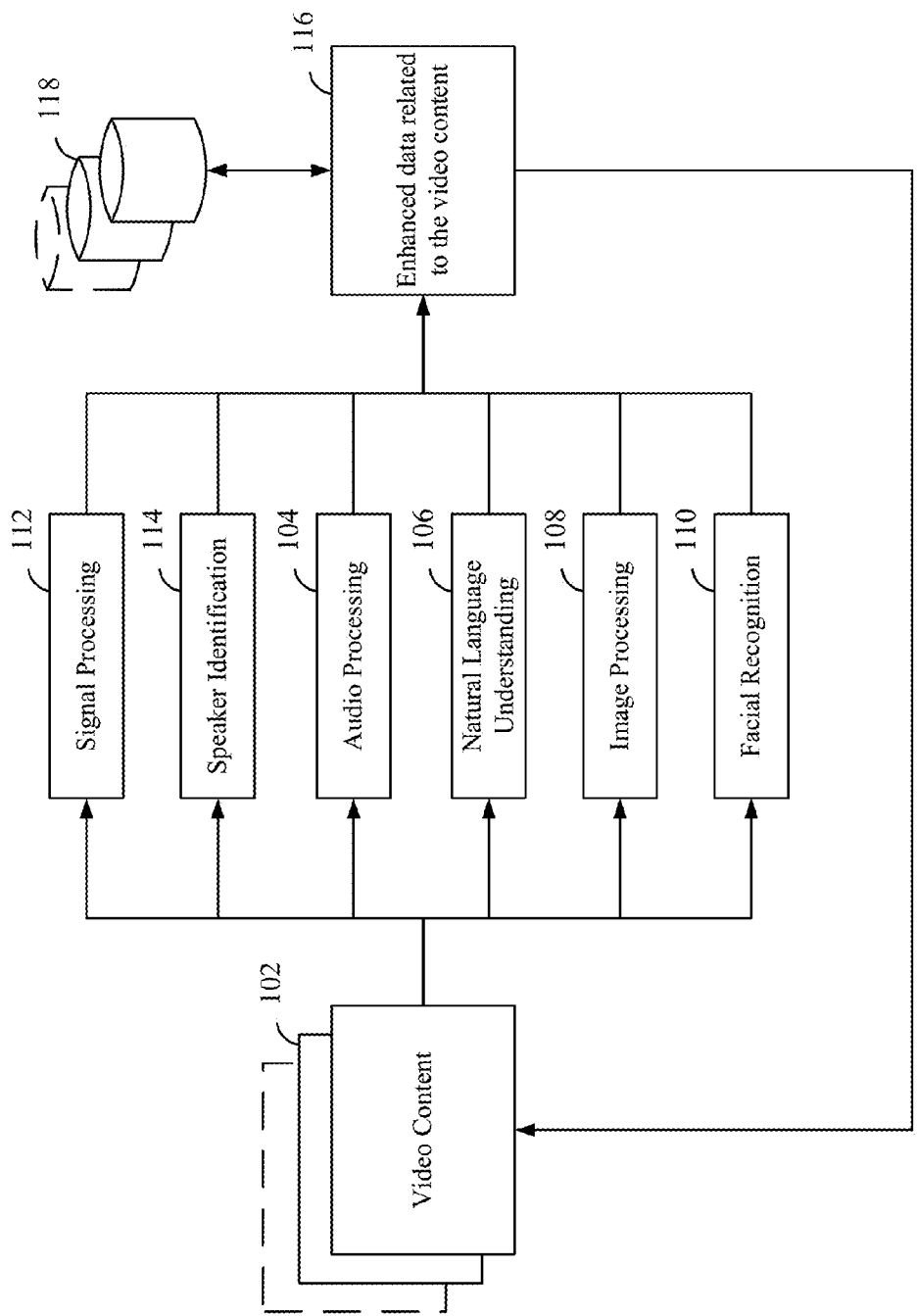
FIG. 1 illustrates analyzing a video content to generate data related to various aspects of the video content according to one aspect of the present disclosure.

FIG. 1 shows a functional block diagram of analyzing a video content and generating data related to various aspects of the video content according to one aspect of the present disclosure. Audio and image data of a video content 102, including, for example, movies, music videos, cartoons, animated videos and television shows, commercials, video clips such as those that can be found on the internet, and other types of video content, is transmitted or input into a number of processes that can break down, analyze and characterize the audio and video data. In one aspect, one or more of audio processing 104 including speech recognition, natural language understanding 106, image processing 108, facial recognition 110, signal processing 112 and speaker identification 114 may be performed on the audio and video data of the video content 102. In another aspect the video content 102 may also include metadata (such as closed captioning text) or other supplementary data regarding the video content 102. That supplementary data may also be processed by the system to provide an enhanced user experience.

The results of the audio processing 104, natural language understanding 106, image processing 108, facial recognition 110, signal processing 112 and speaker identification 114 may individually or in combination with one another be analyzed and/or time coded to characterize aspects of the video content 102. The resulting enhanced data 116 may identify characters or people in the video content, the actors/actresses that perform the roles of the characters or people, songs played in the video content, key quotations or sayings in the video content, filming location, and other aspects of the video content, such as but not limited to, tables, chairs, automobiles, clothing, jewelry, roads, building structures, people, characters, animals, foliage and plants, lamps, lights, doors, and other items and products, as well as positions/actions and facial expressions of the people and/or characters, such as, but not limited to, smiling, laughing, crying, screaming, driving an automobile, dancing, running, walking, talking on a telephone, sleeping, standing, sitting, laying, and other positions/actions and facial expressions.

The enhanced data 116 may be stored in one or more databases 118. The one or more databases 118 may be third party databases and may also include additional data that may be combined with or used in combination with the results of the audio processing 104, natural language understanding 106, image processing 108, facial recognition 110, signal processing 112 and speaker identification 114 to generate the enhanced data 116. The enhanced data 116 may then be used to enhance and/or annotate the video content 102. In this respect, the enhanced data 116 can be sent to a client device of a user viewing the video content 102 to enhance the user's viewing experience by allowing the user to interact with the video content 102. For example, the enhanced data 116 may be used to present a user interface and/or pop-up windows to the user informing the user of relevant data related to certain scenes of the video content 102 the user is viewing, such as, the names of the actors/actresses performing certain roles, the filming location, how certain scenes were created, and other information relating to the video content 102. The enhanced data 116 may be used to display information to the user on the same device that is displaying the video content 102 or on a different device, such as a tablet, phone, or other supplemental device. The system may also send the user a message (such as, an email, test, or other message) regarding the video content 102, such as information regarding particular scenes, where displayed items may be purchased, etc.

Figure 2:
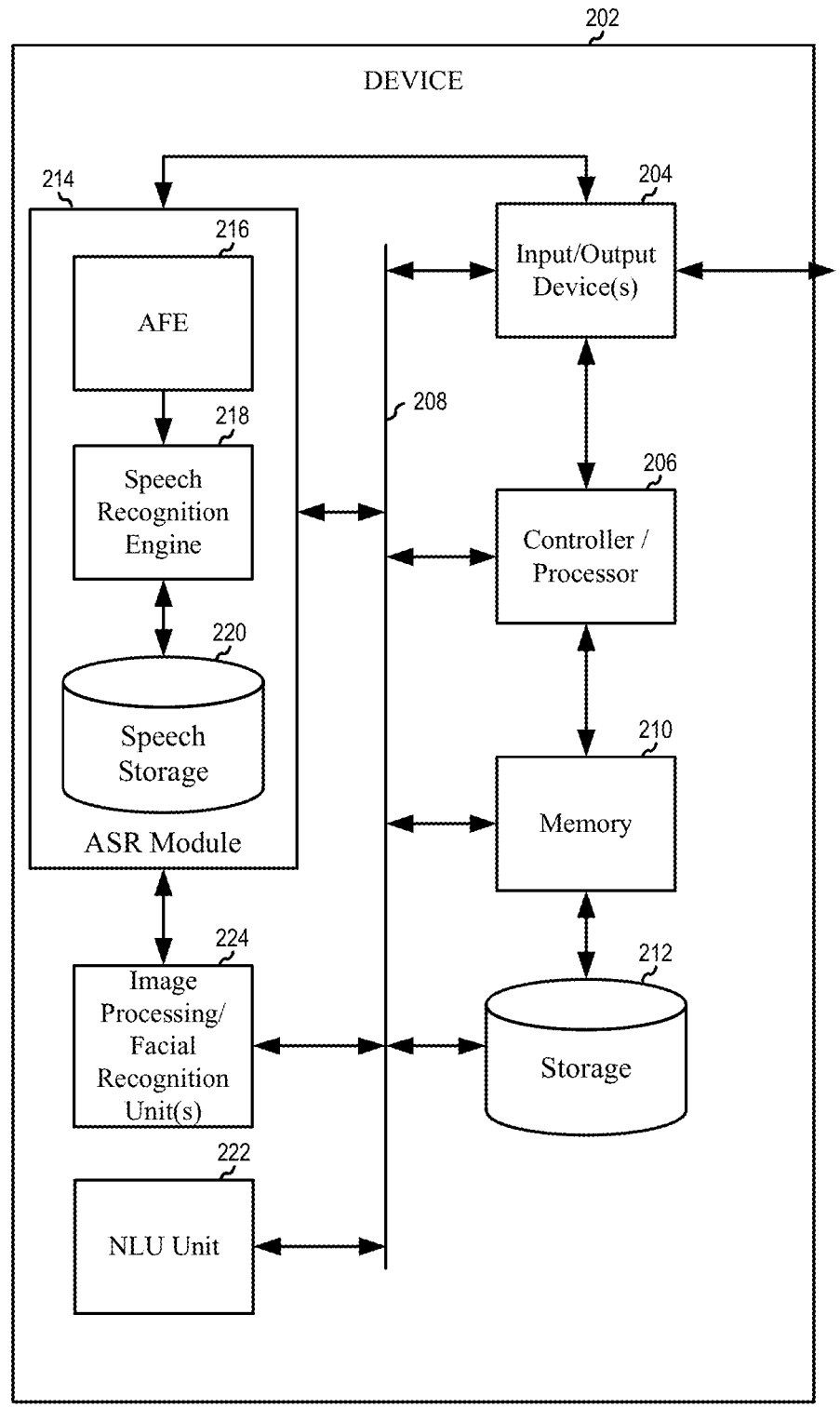
FIG. 2 is a block diagram conceptually illustrating a device for performing video analysis according to one aspect of the present disclosure.

FIG. 2 shows a device 202 for performing video analysis according to the present disclosure. Aspects of the present disclosure include computer-readable and computer-executable instructions that may reside on the device 202. FIG. 2 illustrates a number of components that may be included in the device 202, however other non-illustrated components may also be included. Also, some of the illustrated components may not be present in every device capable of employing aspects of the present disclosure. Further, some components that are illustrated in the device 202 as a single component may also appear multiple times in a single device. For example, the device 202 may include multiple input/output devices 204 or multiple controllers/processors 206.

Multiple devices may be employed in a single video analysis system. In such a multi-device system, the devices may include different components for performing different aspects of the analysis. The multiple devices may include overlapping components. The device as illustrated in FIG. 2 is exemplary, and may be a stand-alone device or may be included, in whole or in part, as a component of a larger device or system.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc.

As illustrated in FIG. 2, the device 202 may include an address/data bus 208 for conveying data among components of the device 202. Each component within the device 202 may also be directly connected to other components in addition to (or instead of) being connected to other components across the bus 208. Although certain components are illustrated in FIG. 2 as directly connected, these connections are illustrative only and other components may be directly connected to each other (such as the ASR module 214 to the controller/processor 206 and/or the NLU unit 222).

The device 202 may include a controller/processor 206 that may be a central processing unit (CPU) for processing data and computer-readable instructions and a memory 210 for storing data and instructions. The memory 210 may include volatile random access memory (RAM), non-volatile read only memory (ROM), and/or other types of memory. The device 202 may also include a data storage component 212, for storing data and instructions. The data storage component 212 may include one or more storage types such as magnetic storage, optical storage, solid-state storage, etc. The device 202 may also be connected to removable or external memory and/or storage (such as a removable memory card, memory key drive, networked storage, etc.) through the input/output device 204. Computer instructions for processing by the controller/processor 206 for operating the device 202 and its various components may be executed by the controller/processor 206 and stored in the memory 210, storage 212, external device, or in memory/storage included in the ASR module 214 discussed below. Alternatively, some or all of the executable instructions may be embedded in hardware or firmware in addition to or instead of software. The teachings of this disclosure may be implemented in various combinations of software, firmware, and/or hardware, for example.

The device 202 includes input/output device(s) 204. A variety of input/output device(s) may be included in the device. Example input devices include an audio capture device, such as a microphone, an audio input port, a touch input device, keyboard, mouse, stylus or other input device. Example output devices include a visual display, tactile display, audio speakers, headphones, printer or other output device. The input/output device 204 may also include an interface for an external peripheral device connection such as universal serial bus (USB), FireWire, Thunderbolt or other connection protocol. The input/output device 204 may also include a network connection such as an Ethernet port, modem, etc. The input/output device 204 may also include a wireless communication device, such as radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, 4G network, etc. Through the input/output device 204 the device 202 may connect to a network, such as the Internet or private network, which may include a distributed computing environment.

The device 202 may also include an automatic speech recognition (ASR) module 214 for processing spoken audio data into text. The ASR module 214 transcribes audio data into text data representing the words of the speech contained in the audio data. The text data may then be used by other components for various purposes, such as annotating the video content, etc. Audio data including spoken utterances input into the device 202, such as included in video content, may be processed in real time or may be saved and processed at a later time. A spoken utterance in the audio data is input to the ASR module 214 which then interprets the utterance based on the similarity between the utterance and models known to the ASR module 214. For example, the ASR module 214 may compare the input audio data with models for sounds (e.g., subword units or phonemes) and sequences of sounds to identify words that match the sequence of sounds spoken in the utterance of the audio data. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Based on the considered factors and the assigned recognition score, the ASR module 214 may output the most likely words recognized in the audio data. The ASR module 214 may also output multiple alternative recognized words in the form of a lattice or an N-best list.

While a recognition score may represent a probability that a portion of audio data corresponds to a particular phoneme or word, the recognition score may also incorporate other information which indicates the ASR processing quality of the scored audio data relative to the ASR processing of other audio data. A recognition score may be represented as a number on a scale from 1 to 100, as a probability from 0 to 1, a log probability or other indicator. A recognition score may indicate a relative confidence that a section of audio data corresponds to a particular phoneme, word, etc.

The ASR module 214 may be connected to the bus 208, input/output device(s) 204, controller/processor 206, NLU unit 222 and/or other components of the device 202. Audio data sent to the ASR module 214 may come from the input/output device 204, such as audio data captured from input video content. Audio data may be in the form of a digitized representation of an audio waveform of spoken utterances. The sampling rate, filtering, and other aspects of the analog-to-digital conversion process may impact the overall quality of the audio data.

The ASR module 214 includes an acoustic front end (AFE) 216, a speech recognition engine 218, and speech storage 220. The AFE 216 transforms audio data into data for processing by the speech recognition engine 218. The speech recognition engine 218 compares the speech recognition data with the acoustic, language, and other data models and information stored in the speech storage 220 for recognizing the speech contained in the original audio data. The AFE 216 and speech recognition engine 218 may include their own controller(s)/processor(s) and memory or they may use the controller/processor 206 and memory 210 of the device 202, for example. Similarly, the instructions for operating the AFE 216 and speech recognition engine 218 may be located within the ASR module 214, within the memory 210 and/or storage 212 of the device 202, or within an external device.

Figure 3:
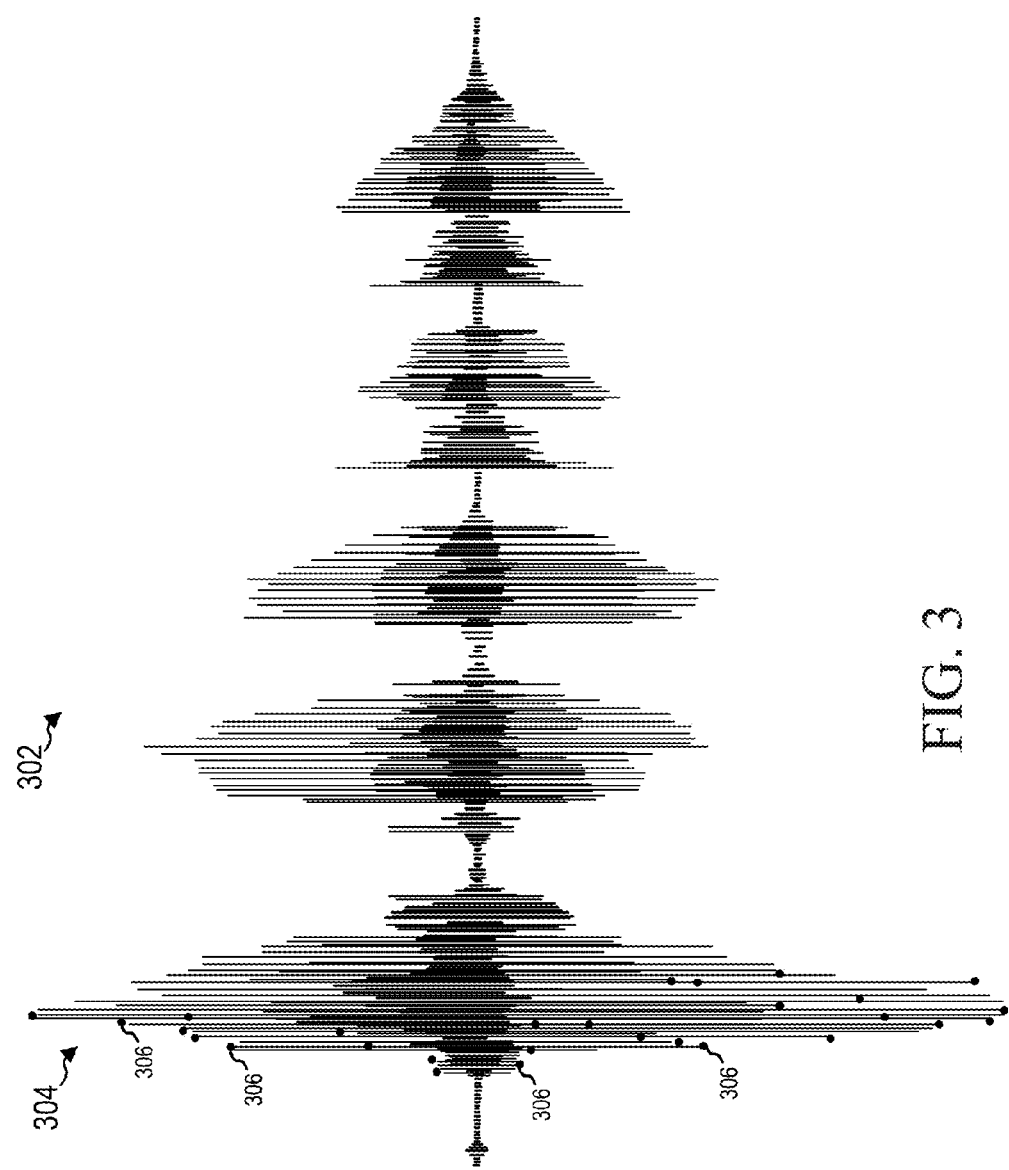
FIG. 3 illustrates an audio waveform processed according to one aspect of the present disclosure.

Received audio data may be sent to the AFE 216 for processing. The AFE 216 may reduce noise in the audio data, identify parts of the audio data containing speech for processing, and segment and process the identified speech components. The AFE 216 may divide the digitized audio data into frames, with each frame representing a time interval, for example 10 milliseconds (ms). During that frame the AFE 216 determines a set of values, called a feature vector, representing the features/qualities of the utterance portion within the frame. Feature vectors may contain a varying number of values, for example forty. The feature vector may represent different qualities of the audio data within the frame. FIG. 3 shows a digitized audio data waveform 302, with multiple points 306 of the first word 304 as the first word 304 is being processed. The audio qualities of those points may be stored into feature vectors. Feature vectors may be streamed or combined into a matrix that represents a time period of the spoken utterance. These feature vector matrices may then be passed to the speech recognition engine 218 for processing. A number of approaches may be used by the AFE 216 to process the audio data. Such approaches may include using mel-frequency cepstral coefficients (MFCCs), perceptual linear predictive (PLP) techniques, neural network feature vector techniques, linear discriminant analysis, semi-tied covariance matrices, or other approaches known to those of skill in the art.

Processed feature vectors may be output from the ASR module 214 and sent to the input/output device 204 for transmission to another device for further processing. The speech recognition engine 218 may process the output from the AFE 216 with reference to information stored in the speech storage 220. Alternatively, post front-end processed data (such as feature vectors) may be received by the ASR module 214 from another source besides the internal AFE 216. For example, another entity may process audio data into feature vectors and transmit that information to the device 202 through the input/output device(s) 204. Feature vectors may arrive at the device 202 encoded, in which case they may be decoded (for example by an encoder/decoder) prior to processing by the speech recognition engine 218.

The speech storage 220 includes a variety of information for speech recognition such as data matching pronunciations of phonemes to particular words. This data may be referred to as an acoustic model. The speech storage may also include a dictionary of words or a lexicon. The speech storage may also include data describing words that are likely to be used together in particular contexts. This data may be referred to as a language or grammar model. Other information may also be stored in the speech storage 220 for use in speech recognition. The contents of the speech storage 220 may be prepared for general ASR use or may be customized to include sounds and words that are likely to be used in a particular application. For example, for ASR processing of a movie or video, the speech storage 220 may include customized data specific to certain characters, actors, and actresses. In certain instances the speech storage 220 may be customized based the individualized speech input. To improve performance, the ASR module 214 may revise/update the contents of the speech storage 220 based on feedback of the results of ASR processing, thus enabling the ASR module 214 to improve speech recognition beyond the capabilities provided in the training corpus.

The speech recognition engine 218 attempts to match received feature vectors to language phonemes and words as known in the speech storage 220. The speech recognition engine 218 computes recognition scores for the feature vectors based on acoustic information and language information. The acoustic information is used to calculate an acoustic score representing a likelihood that the intended sound represented by a group of feature vectors match a language phoneme. The language information is used to adjust the acoustic score by considering what sounds and/or words are used in context with each other, thereby improving the likelihood that the ASR module outputs speech results that make sense grammatically.

Following ASR processing of audio in a video input, a natural language understanding (NLU) unit 222 may be used to make use of the resulting text and to appropriately analyze and annotate the video content. The NLU unit 222 may include a dedicated NLU engine, processor, memory and/or other components, or may use components otherwise available on the device 202. The NLU unit 222 takes the textual output of ASR processing or takes textual input received from another device and attempts to make a semantic interpretation of the text. That is, the NLU unit determines the meaning behind the text based on the individual words and then implements that meaning. The NLU processing is based on the models and programming available to the NLU unit 222. Such models may be grammar based, rule based, or constructed in a different manner. The NLU unit 222 interprets the text string to derive an intent or a desired action of the speaker as well as the pertinent pieces of information in the text that let you complete that action. The NLU may be configured to annotate text as part of NLU processing. For example, in a text " . . . my husband, John, . . . ", "husband" may be annotated as a relationship identifier and "John" may be annotated as a character. To correctly perform NLU processing of speech input the NLU may be configured to communicate with a variety of other components/applications of a device.

The device 202 may also include an image processing unit/facial recognition unit 224. The image processing unit/facial recognition unit 224 may process image data of the video content to identify aspects or events of the video content, such as actor/actress and character appearances and items and other aspects or events that occur in the video content. The resulting data may then be used by other components for various purposes, such as annotating the video content, etc. Image data, such as video frames and images included in video content, input into the device 202, may be processed, for example, using signal processing techniques, in real time or may be saved and processed at a later time. A video frame or image generally contains multiple aspects or objects, each of which may be one or more sub-images or regions-of-interest within the video frame that may be analyzed. In one aspect, the image processing unit/facial recognition unit 224 may process the image data and generate or output a resulting image or a set of characteristics or parameters related to the image data.

For example, in facial recognition processing, the image may be an image of a face of an actor/actress or character. The image of the actor/actress or character may be analyzed to identify certain facial features and these facial features may be compared to identified features of certain actors/actresses and characters in a database. In this example, a name of the actor/actress or character in the image may be identified. In another example, the image may be a landmark displayed in a scene of the video content. The image of the landmark may be analyzed to identify certain features of the landmark and these features may be compared to identified landmarks in a database to identify a name and geographic location of the landmark.

The device 202 may also include an audio processing unit 226. The audio processing unit 226 may process audio data of the video content to identify aspects or events of the video content, such as songs, audio special effects, etc. The audio processing unit 226 may process audio that may not be recognizable or processed by the ASR module 214. The resulting data from the audio processing unit 226 may then be used by other components for various purposes, such as annotating the video content, creating the chronology, etc.

Figure 4:
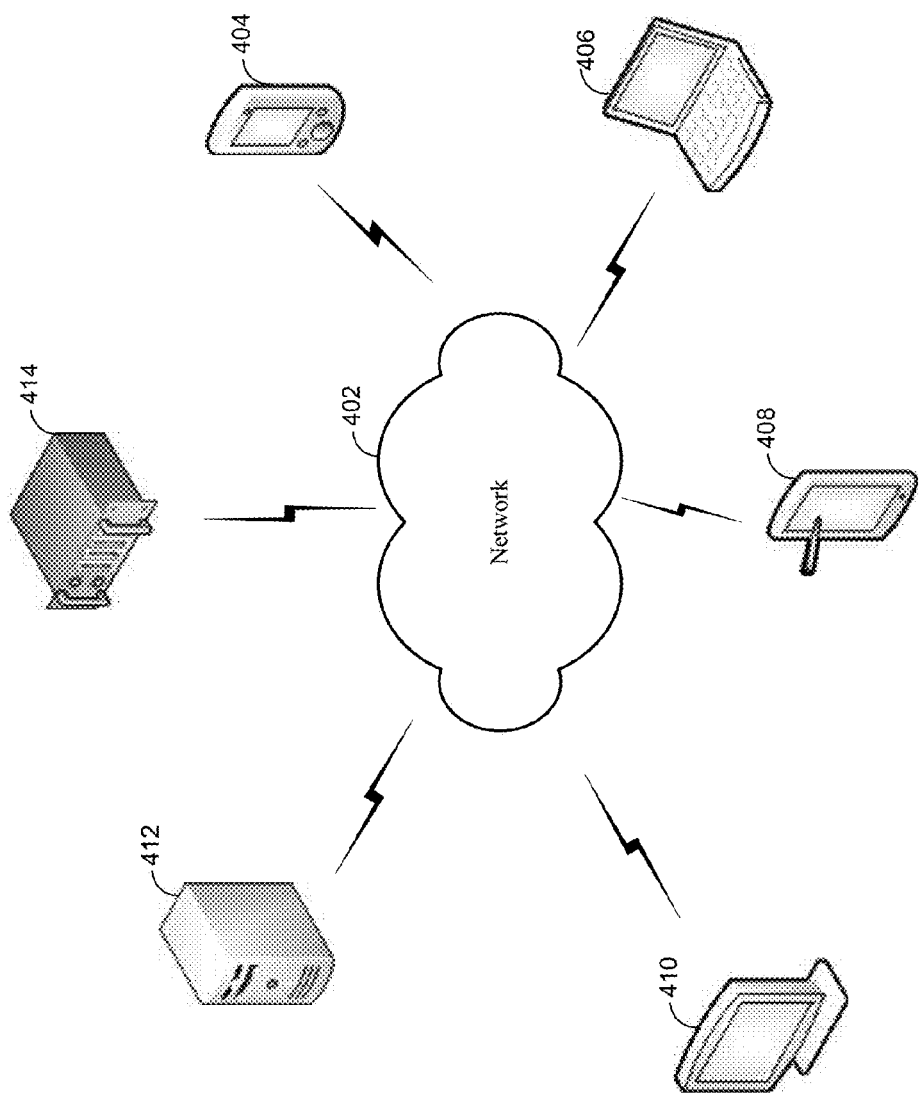
FIG. 4 illustrates a computer network for use with distributed speech processing according to one aspect of the present disclosure.

As shown in FIG. 4, multiple devices may be connected over a network 402. Network 402 may include a local or private network or may include a wide network such as the internet. Devices may be connected to the network 402 through either wired or wireless connections. For example, a wireless device 404 may be connected to the network 402 through a wireless service provider. Other devices, such as television 410, may connect to the network 402 through a wired connection. Other devices, such as laptop 406 or tablet computer 408 may be capable of connection to the network 402 using various connection methods including through a wireless service provider, over a WiFi connection, or the like. Networked devices may input spoken audio through a number of audio input devices. Audio input devices may be connected to networked devices either through a wired or wireless connection. Networked devices may also include embedded audio input devices.

In certain configurations, one device may capture or receive a video content and other device(s) may perform the video analysis. For example, video input may be received by television 410 and sent over the network 402 to computer 412 or server 714 for processing. Or computer 406 or television 410 may partially process the video content before sending it over the network 402.

In one aspect, the ASR processing and NLU techniques described may be used to analyze and generate enhanced data corresponding to video content, including, for example, movies, television shows, music videos, cartoons, animated videos, commercials, video clips such as those that can be found on the Internet, and other types of video content. Other techniques, such as signal processing, audio processing, facial recognition and image processing techniques may also be combined with the ASR processing and NLU techniques to automatically generate the enhanced data. This enhanced data may include identifying events, including time bracketed information, that occur in the video content, for example, an actor/actress who is speaking or appearing, dialogue being spoken, soundtrack information, products and items displayed, actions being performed, scenes, frames, filming location, cast and character images and information, biographical information, key quotations or sayings, goofs, and other information about the video content. The enhanced data may be used to enhance and/or annotate the video content for viewing by a user. In one example, the enhanced data may be time coded to the video content to identify the beginning and end period of time within the video content or scene of the video content that the enhanced data relates to or corresponds to.

For example, video content may be offered for downloading or streaming from a server to a user via a network, and the enhanced data may be sent to the user along with the video content. A user interface may be rendered to present relevant enhanced data from the collection of enhanced data that has been sent to the client. In one example, upon pausing the video content, the user interface may be rendered that presents the enhanced data to the user, for example, such as, headshots, names, character names for all cast members who perform in the current scene of the video content, names of songs being played in the current portion or scene of the video content, and other relevant enhanced data. Alternatively, the user interface may be provided to an alternate device to be viewed alongside the video content as desired by a user.

Figure 5:
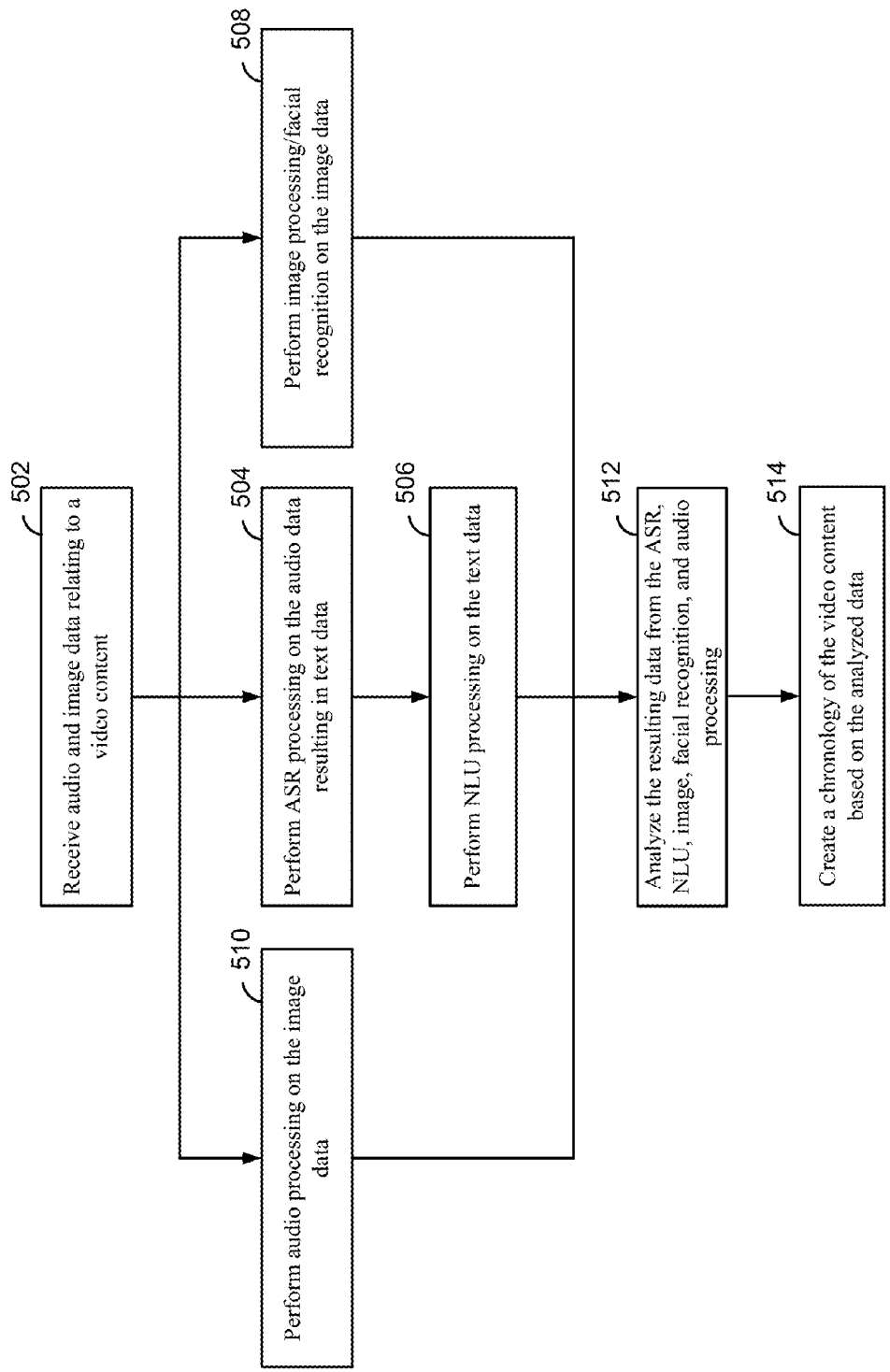
FIG. 5 illustrates a flow diagram of a method for creating a chronology of aspects of a video content according to one aspect of the present disclosure.

In an aspect, video content may be analyzed and a chronology of the video content may be created that identifies events of the video content. A chronology is a catalog of certain events, scenes, songs, audio, and other features, of a video content where the features may be identified according to time they appear in the video content. The features of the chronology may be linked in various ways to other features of the video content, features of other video content (such as scenes of interest in other video content) or miscellaneous data or information that may be of interest to potential viewers of the video content. FIG. 5 shows a flow diagram of a method of creating a chronology according to one aspect of the present disclosure. The device, which may be the device 202 described above, receives audio data and image data corresponding to a video content, illustrated as 502. The audio data can be processed into resulting text data, for example, by performing ASR processing on the audio data, illustrated as 504. Additionally, NLU processing may be performed on the resulting text, illustrated as 506. In one aspect, the image data of the video content may be processed using image processing and/or facial recognition techniques, illustrated as 508. In another aspect, the audio data of the video content may be processed using audio processing techniques, illustrated as 510.

The data generated from the ASR processing, the NLU processing, the audio processing, and/or the image/facial recognition processing may be analyzed, illustrated as 512, and a chronology of the video content may be created, illustrated as 512, that identifies, for example, actor/actress and character appearances, an actor/actress who is speaking, dialogue being spoken, soundtrack information, products and items displayed, actions being performed, scenes, frames, subjects of the scenes, filming location, cast and character images and information, biographical information, key quotations or sayings, goofs, and other information about the video content. In one aspect, the chronology of the video content may be a combination of events that occur in the video content. The events may correspond to one or more time bracketed aspects of the video content, for example, an actor appearance, a song playing, and other aspects.

Figure 6:
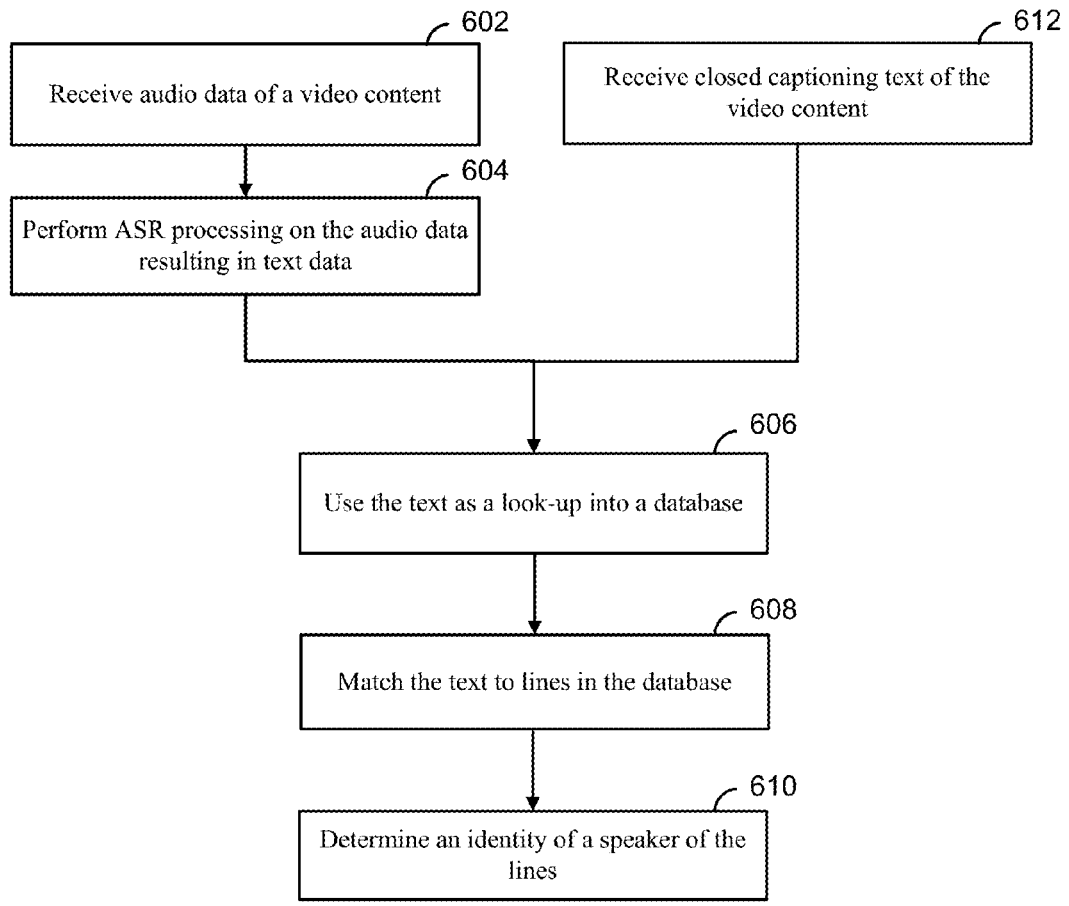
FIG. 6 illustrates a flow diagram of a method for using speech recognition techniques to identify a character or person in a video content according to one aspect of the present disclosure.

In an aspect, the techniques described above may be used to identify a character or person in the video content that is speaking FIG. 6 shows a flow diagram of a method for using the ASR techniques to identify the character or person. The device, which may be the device 202 described above, receives audio data of the video content including lines spoken by the character or person, illustrated as 602. The spoken audio data can be processed into resulting text data, for example, by performing ASR processing, illustrated as 604. The resulting text may be used to look-up, in a database, the specific character in the video content that corresponds to the resulting text, illustrated as 606. The database may be a third party database and include scripts of various video contents tagged with the characters/people who speak certain lines, quotations tagged with the video content and the characters who speak the quotations, and other information of the type or combinations thereof. In this aspect, the resulting text may be matched to a line in the database, illustrated as 608, and the character/person who spoke the line may be identified, illustrated as 610.

In another aspect, if the video content may include closed captioning text, the closed captioning text may be used to identify the character that is speaking, as described above, in addition to or instead of the ASR processing. In this aspect, the device receives the closed captioning text of the video content, illustrated as 612, and then proceeds through the steps illustrated as 606-610 to identify the character/person who spoke the line.

Figure 7:
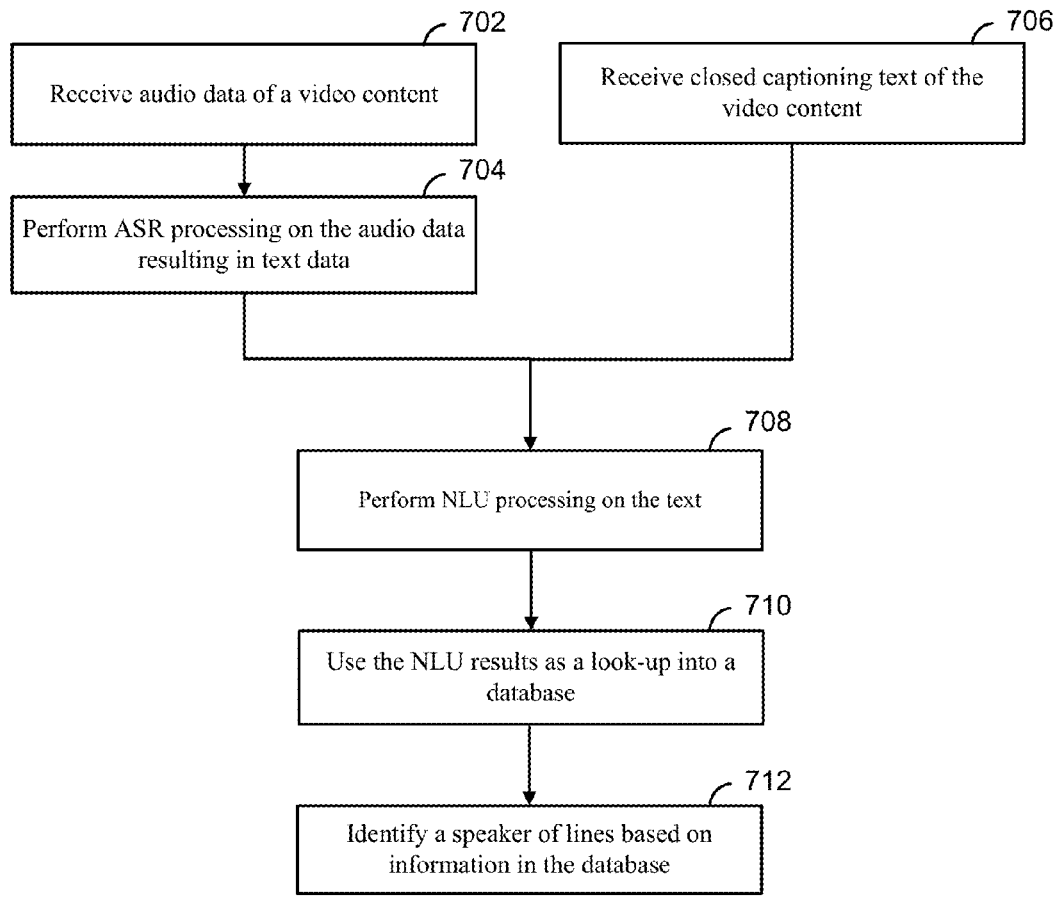
FIG. 7 illustrates a flow diagram of a method for using natural language understanding techniques to identify a character or person in a video content according to one aspect of the present disclosure.

In another aspect, the database may include information about the characters and/or people in the video content, for example, including but not limited to, the character names, their roles in the video content, their relationships to other characters, their jobs, their living arrangements, and other information about the characters. In this aspect, the content of the resulting text can be used to infer the identity of the character that spoke the utterance. FIG. 7 shows a flow diagram of a method for using the NLU techniques to identify the character or person. The device, which may be the device 202 described above, receives audio data of the video content including lines spoken by the character or person, illustrated as 702. The spoken audio data can be processed into resulting text data, for example, by performing ASR processing, illustrated as 704. In another aspect, if the video content includes closed captioning text, the closed captioning text may be used to identify the character that is speaking, as described above. In this aspect, the device receives the closed captioning text of the video content, illustrated as 706.

The text may then be processed using the NLU techniques described above, illustrated as 708. For example, in a text " . . . my husband, John . . . ", "husband" may be annotated as a relationship identifier and "John" may be annotated as a character identifier. In this example, the character is likely married to another character named John. The results of the NLU processing may be used to look-up, in the database, the character in the video content that is married to John, illustrated as 710. By looking in the database how John is related to the other characters and/or who is married to John it may be found that John is married to Jane. The identity of the speaker of the utterance can be inferred based on the information in the database, illustrated as 712, in this case Jane is likely the character that spoke the utterance.

Figure 8:
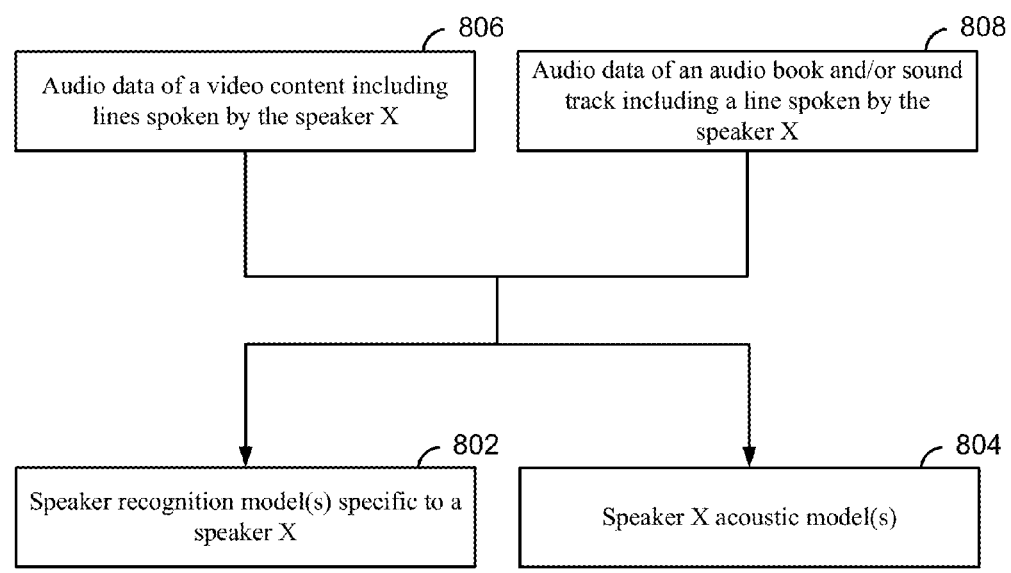
FIG. 8 illustrates a functional block diagram of training speaker recognition models specific to a speaker according to one aspect of the present disclosure.

In an aspect, speaker recognition models and speaker acoustic models for specific actors, actresses, characters, and other people or characters that speak lines in a video content may be created and used to identify the speaker of a line in video content. FIG. 8 shows a functional block diagram of training speaker recognition and acoustic models specific to speaker X. Speaker X may be a famous actor/actress who appears in various video content and one or more speaker recognition model may be made based on his/her voice that is applicable to multiple pieces of content. The speaker X recognition models 802 and the speaker X acoustic models 804 are created based on known audio spoken by the speaker X. A training corpus may be used to train the speaker X recognition models 802 and the speaker X acoustic models 804. The training corpus may receive or have sample audio data and textual data, including utterances of a speaker X, for example, from audio or video contents, such as, for example, movies, audio books, soundtracks, and other sources, that may be used to train the speaker X recognition models. Additional audio data of the speaker X, for example, from new video content or other sources, may also be fed back into the training corpus, for example, using an iterative process, to train the speaker X recognition models. By using audio data from multiple sources and different video contents, the specific speaker recognition models may be trained to account for voice changes of the character or person due to aging, the use of various accents, different roles being played by the character or person, and other similar changes and modifications.

Referring to FIG. 8, in one example, the data may include audio data of a video content 806 including a line spoken by the speaker X; and/or audio data of an audio book and/or sound track 808 including a line spoken by the speaker X. The audio data of a video content 806 and/or the audio data of an audio book and/or sound track 808 may be fed into the speaker X model(s) 802/804 to train the speaker X model(s) 802/804. In an example, if a video content is time coded with actor/actress appearances and/or speech, then it is known when a specific actor/actress is speaking in the video content. In this regard, the known portion of the video content may be used to train the speaker recognition and acoustic models for the specific actor/actress.

Figure 9:
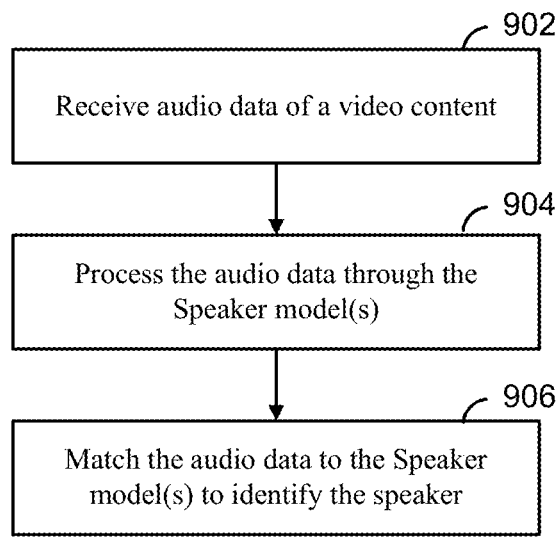
FIG. 9 illustrates a flow diagram of a method for using the speaker recognition models to identify the speaker of an utterance in a video content according to one aspect of the present disclosure.

In this aspect, speaker recognition and acoustic models for specific actors, actresses, characters, and other people or characters that speak utterances in a video content may be created, and compared to utterances of the speaker to identify the speaker of the utterance by character name and/or actors/actresses name. FIG. 9 shows a flow diagram of a method for using the speaker recognition and acoustic models to identify the speaker of an utterance. The device, which may be the device 202 described above, receives audio data of a video content including utterances spoken by a character or person, illustrated as 902. The spoken audio data is processed through the specific speaker recognition and/or acoustic model(s), illustrated as 904. The audio data is matched to a specific speaker recognition model and the identity of the character or person that spoke the line is identified based on the specific speaker recognition and/or acoustic model that matches the audio data, illustrated as 906.

In one aspect, if there is more than one speaker in the spoken audio data of the video content, the audio data may be processed using audio processing techniques to separate the audio signals of the different speakers. Then the speaker specific recognition and/or acoustic models may be applied to the separate audio signals to identify the speakers.

In an aspect, the number and identity of the characters or people in a video content may be generally known, for example, based on the credits. The known number and identity of the characters or people in the video content may act as a constraint. For example, if there are fifty actors/actresses in the video content, an actor/actress that is speaking must be one of the fifty actors/actresses in the video content. In another aspect, if the video content is time coded with actor/actress appearances, then the number and identity of the characters or people in a particular scene of the video content may be constrained even further. For example, if it is known that the utterance(s) of interest are in a scene that includes two characters or people, then the one that is speaking the utterance must be one of the two. The known number and identity of the characters or people in the video content may be factored into any of the processes described herein. By taking into account the number and identity of the characters or people in the video content, the accuracy and efficiency of the process of identifying an actor/actress that is speaking can be increased. This is because the identity of the actor/actress that is speaking is constrained to one of the actors/actresses in the video content or scene of the video content.

Once the character is identified, the character's name may be used to enhance and/or annotate the video content. For example, the character names may be time coded with the appearances of the character in the video content, inserted into closed captioning text for the video content to identify the characters, by name, when the characters are speaking, and/or presented to a user viewing the video content.

In other aspects, the above techniques used to identify characters or people in a video content may be used to identify un-credited roles. For example, an actor may have performed briefly in a video content where the actor may not have received credit for the role and it may not be widely known that the actor even appeared in the video content. In this aspect, the techniques described above may be used to analyze video content and identify such un-credited roles, for example, using the speaker recognition and/or acoustic models for the specific actor.

In an aspect, audio processing, ASR techniques and/or NLU techniques may be used to detect and identify screaming, laughing, crying, and other sounds that correspond to emotions within a video content. In this aspect, models for detecting sounds that correspond to emotions may be created and trained, for example, in a similar manner as described above. This information may be used to classify certain scenes according to emotional content (dramatic, happy, anger, scary, sad, joyful, etc.) or otherwise annotate the video content.

In another aspect, ASR and/or NLU techniques may be used to detect and identify music within a video content. While, the songs that are played in a video content may be generally known, for example, based on the soundtrack, it is not always easy to identify which song is playing when in a video content. Often times the music in a video content is background music and the characters may be speaking over the music making it difficult to identify what the music is.

Figure 10:
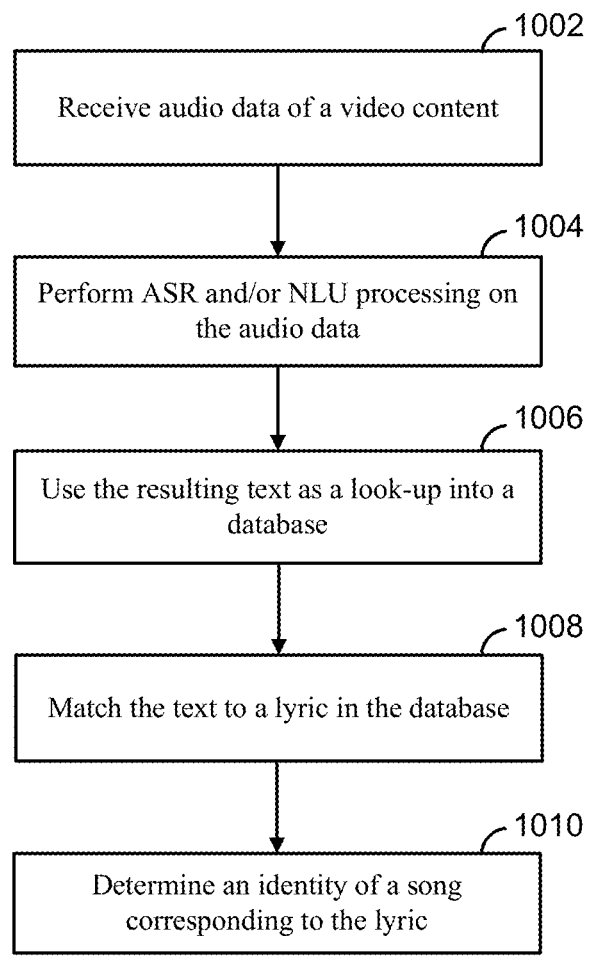
FIG. 10 illustrates a flow diagram of a method of identifying a song in a video content according to one aspect of the present disclosure.

FIG. 10 shows a flow diagram of a method of identifying a song. The device, which may be the device 202 described above, receives audio data of a video content including utterances spoken by a character or person, illustrated as 1002. ASR and/or NLU processing is performed on the audio data, illustrated as 1004. The ASR and/or NLU processing may include identifying and removing other noise, for example, the dialogue between the characters or people in the audio data and other sounds that may also be present in the audio data. In one aspect, the ASR and/or NLU processing may result in textual data. The textual data may be used as a look-up into a database, illustrated as 1006. The database may be a third party database and may include for example, song titles associated with their respective artists, lyrics, albums, and other similar data corresponding to the songs. In one aspect, the resulting textual data may be lyrics of a song. The resulting textual data may then be matched to lyrics in the database, illustrated as 1008, and the song may be identified, illustrated as 1010. The known songs, based on the soundtrack, can also act as a constraint when identifying a song being played in the video content.

The entire song may not need to be processed. Merely one or more portions of the song may be used to match the song in the database. For example, in some scenarios a first portion of the song may distinguishable, while during other portions of the song other sounds in the audio content make it difficult to distinguish or hear the song, and then a second portion of the song can be distinguished. Even though there is a gap in the ability to distinguish the song, the device should understand that, based on the first portion and the second portion that it is a continuous version of the song and match the song in the database using the first and second portions. In one aspect, once the song/music has been identified, it may be removed from the audio data of the video content to allow for better ASR and NLU processing of the dialogue of the characters or people in the video content.

In an aspect, the video content may be processed using facial recognition techniques to identify the people and/or characters that appear in the video content. In this aspect, facial recognition models for specific actors, actresses, characters, and other people or characters that appear in a video content may be created. Further, where the actor, actress, person, or character appears in multiple items of video contents, the various appearances may be used to train the facial recognition model taking into account aging and other facial feature changes that may occur or happen throughout the life of the where the actor, actress, person, or character or during the video content. The facial recognition techniques may be combined with the other techniques described herein, as described in more detail below.

In another aspect, the video content may be processed using image processing techniques other than facial recognition techniques that may be used to identify various aspects of the video content. For example, the image processing may involve the use of image classifiers adapted to identify items and products that appear in the video content, such as, but not limited to, tables, chairs, automobiles, clothing, jewelry, roads, building structures, statues, people, characters, animals, foliage and plants, lamps, lights, doors, and other items and products. Additionally, the image processing may identify positions/actions and facial expressions of the people and/or characters, such as, but not limited to, the character or person smiling, laughing, crying, screaming, driving an automobile, dancing, running, walking, talking on a telephone, sleeping, standing, sitting, laying, and other positions/actions and facial expressions.

Figure 11:
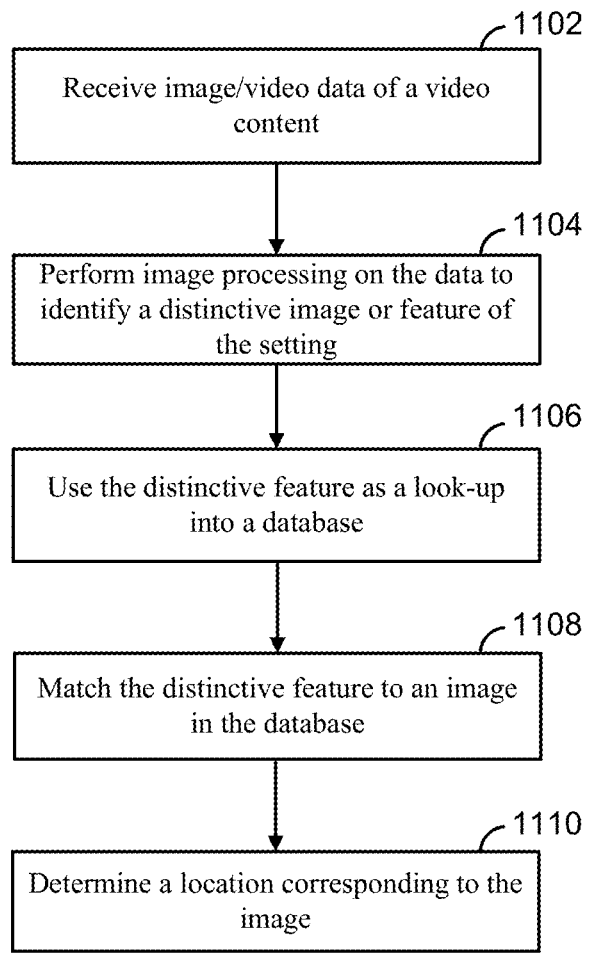
FIG. 11 illustrates a flow diagram for identifying filming locations based on image data of a video content according to one aspect of the present disclosure.

In one aspect, the image processing may be used to determine a filming location of one or more portions of a video content. FIG. 11 shows a flow diagram for determining a filming location of at least a portion or scene of a video content. Image or video data of a video content is received, illustrated as 1102. Image processing is performed on the data to identify one or more distinctive features of the setting in the video content, illustrated as 1104. For example, the distinctive feature may be a building, a statue, a body of water, a wall, a street, or other features of the type. This distinctive feature may be used as a look-up into a database, illustrated as 1106. In this aspect the database may be a third party database that includes, images of features of various locations throughout the world. The distinctive feature may be matched to a feature in the database, illustrated as 1108. For example, the distinctive feature may include one or more buildings that match the buildings located in Times Square in New York. The filming location of the portion of the video content including the distinctive feature may then be determined based on the location of the feature in the database that matches the distinctive feature, illustrated as 1110.

The facial recognition techniques and/or the image processing techniques may be combined with the audio processing techniques and the ASR and NLU techniques to identify characters or people in a video content. For example, the facial recognition techniques may provide additional assurances that the speaker being identified using the other techniques is accurate. Similarly, the image processing techniques could be used to identify a character or person by the clothing and/or jewelry that is being worn or by the action that the character or person is performing. For example, the image processing results may indicate that a character is wearing a red hat. The aspect of the red hat may be used as a look-up into a database to identify who wears a red hat in the video content. In this example, the database may include information about the characters and/or people in the video content, for example, including but not limited to, the clothing characters or people wear, the jewelry characters or people wear, the actions that the characters perform at various times throughout the video content, and other data about the characters. In this aspect, the image processing results can be used to infer the identity of a character in the video content. These results could also be used in combination with the other techniques described herein to provide additional data as to the identity of one or more characters and other aspects of the video content.

In an aspect, one or more of the audio processing techniques, ASR processing techniques, the NLU techniques, the facial recognition techniques and the image processing techniques may be used to detect and differentiate scenes of a video content. In general, a scene corresponds to a period of time in the video content having multiple frames, and may be determined as having a distinct plot element or setting. In this aspect, a combination of aspects or events, for example, including a change in one or more characters that appear or are on screen in the video content, a change in the music or song, a change in the dialogue or a pause in the dialogue, a change in the topic of the dialogue, a change in camera perspective, a change in scenery, and other aspects or events, may be used to indicate and detect scenes of the video content. In one example, the aspects or events may be weighted in a classifier to determine when a scene begins and ends. In another aspect, the facial recognition techniques and the image processing techniques may be combined with the data relating to the topics of the dialogue and weighted in a classifier to determine when a scene begins and ends.

In one aspect, a combination of aspects or events of a first portion (for example, a length of time) of the video content are compared to a combination of aspects or events of portions of the video content that precede and/or follow the first portion. A score may be calculated or assigned based on the relationships of the portions of the video content (for example, the similarities and differences of the portions). Based on these scores a determination may be made as to when a scene ends and begins. For example, when two portions of the video content are similar, the two portions may be determined to be a single scene. Alternatively, when two portions of the video content are different, the two portions may be determined to be two separate scenes.

Figure 12:
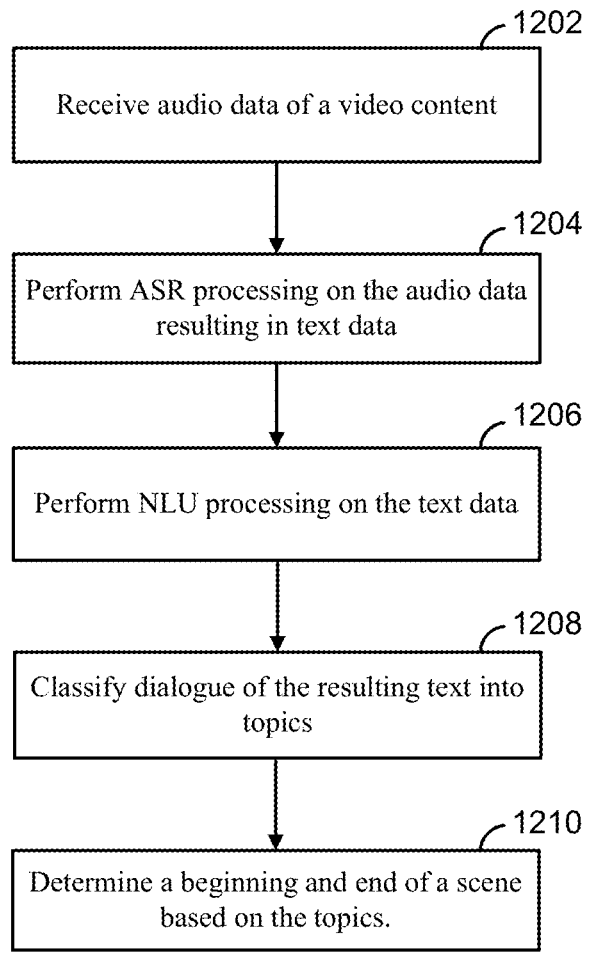
FIG. 12 illustrates a flow diagram for identifying scenes based on audio data of a video content according to one aspect of the present disclosure.

In one aspect, the audio data of a video content may be processed into text data and analyzed using NLU techniques to determine a topic of the dialogue, and changes in the topic. FIG. 12 shows a flow diagram for detecting scenes based on the audio data of a video content. The device, which may be the device 202 described above, receives audio data of a video content, illustrated as 1202. ASR processing is performed on the audio data transforming the audio data into resulting text data, illustrated as 1204. NLU processing can then be performed on the resulting text data, illustrated as 1206, to classify the dialogue in the audio data into various topics, illustrated as 1208. Based on the topics of the dialogue, the video content can be broken down into scenes, illustrated as 1210, for example, as a result of changes in the topics of the dialogue.

In an aspect, one or more of the ASR processing techniques, the NLU techniques, the facial recognition techniques and the image processing techniques may be used to identify scenes or portions of a video content to classify and/or provide a user ratings. For example, in a parental guide concept, portions of the video content that include blood, derogatory or offensive language, a person or character becoming deceased, and other aspects that may be considered frightening or unsuitable for children may be identified and tagged. These aspects may be used to present a detailed guide rating of the video content as opposed to the vague PG, PG-13, R, etc. ratings. For example, the guide rating may identify or inform the user of what the tagged aspects of the video content include. This can also allow a user to skip those portions of the video content that may be unsuitable for certain audiences.

Figure 13:
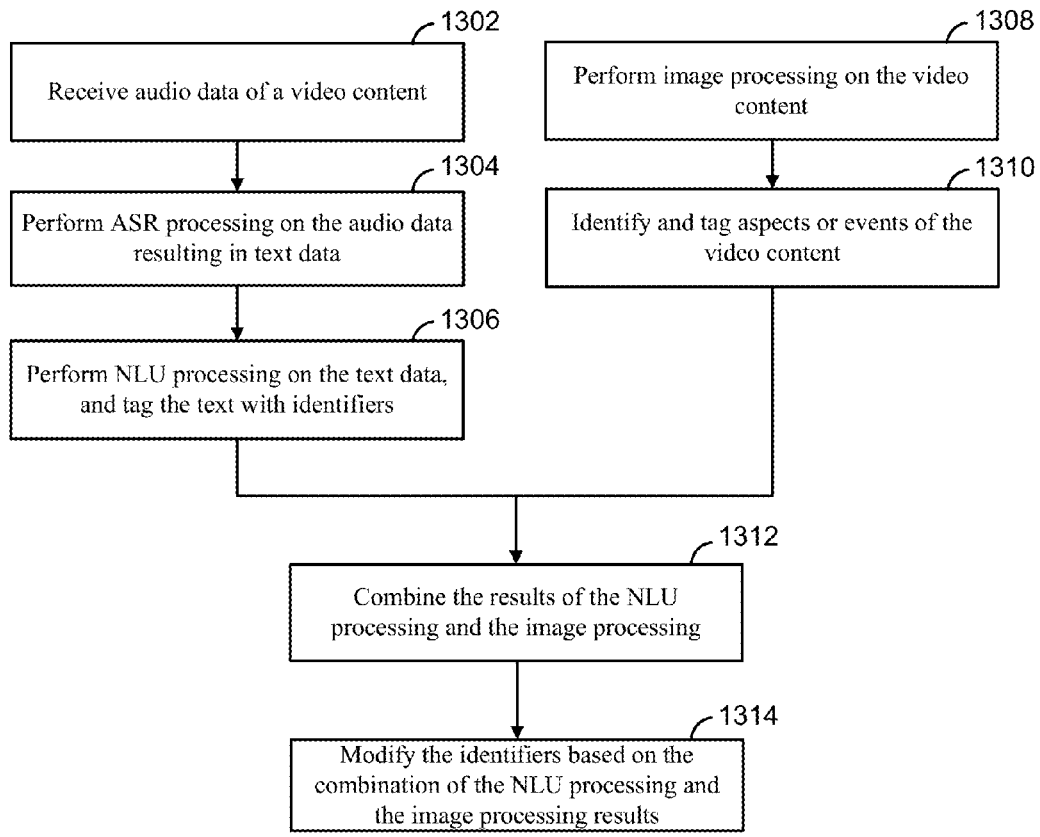
FIG. 13 illustrates a flow diagram for identifying and tagging scenes or portions of a video content according to one aspect of the present disclosure.

FIG. 13 shows a flow diagram for identifying and tagging scenes or portions of a video content. The device, which may be the device 202 described above, receives audio data of a video content, illustrated as 1302. ASR processing is performed on the audio data transforming the audio data into resulting text data, illustrated as 1304. NLU processing may then be performed on the resulting text data to annotate or tag portions of the text data with identifiers, illustrated as 1306. An identifier is an indication categorizing the content of a portion of the video content. For example, if a portion of the text includes sexual references, the portion may be tagged with a sexual content identifier. In another example, if a portion of the text includes screaming or references to killing or death, the portion and aspects may be tagged with a violent content identifier. In yet another example, if a portion of the text includes references to nudity or sex, the portion and aspects may be tagged with an explicit content identifier. Other portions of the text may be tagged with one or more identifiers in a similar manner.

In another aspect, image processing may be performed on the video content, illustrated as 1308. In a similar manner, aspects and events of the video content may be identified and tagged with identifiers, illustrated as 1310. For example, if a portion of the video content includes nudity, the portion may be tagged with a sexual content or explicit content identifier. In another example, if a portion of the video content includes blood, the portion may be tagged with a violent content identifier. In yet another example, if a portion of the video content includes a death, the portion may be tagged with a death content identifier. Other portions of the video content may be tagged with identifiers in a similar manner.

In yet another example, the results of the image processing and the NLU processing may be combined and/or compared, illustrated as 1312, to edit or alter the identifiers. For example, there may be portions of the text that include text related to killing, but the reference may simply be a relatively harmless threat spoken out of anger or emotion by one of the characters. In this instance, the video content may not include any violence at all. By combining the results of the image processing with the results NLU processing, it may be determined that the text portion including the harmless threat is retagged with a different identifier, as opposed to the violent content identifier, illustrated as 1314.

In an aspect, the techniques described above to generate enhanced data of a video content may be used to compare different versions of the video content. In this aspect, various versions of a video content, for example, the theatrical version and the director's cut, may be compared to detect and identify the differences, i.e., added or deleted scenes, between the different versions. This can be used to inform a user, watching the video content of exactly where and what scenes were removed or added to the theatrical version or director's cut, or highlight other differences between versions. Version may also be linked, offering users the ability to access different versions of video content as desired.

Figure 14:
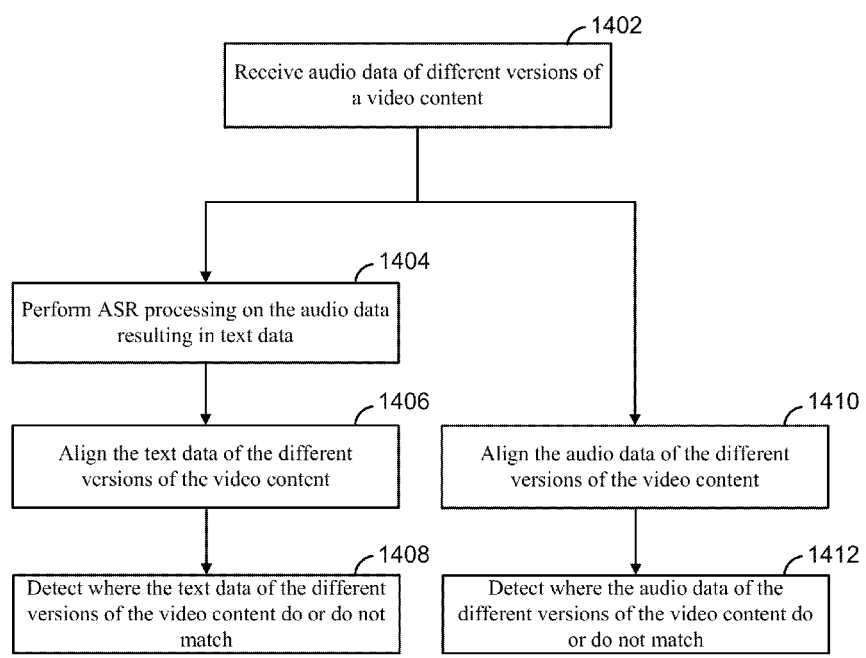
FIG. 14 illustrates a flow diagram for identifying differences between various versions of a video content according to one aspect of the present disclosure.

FIG. 14 shows a flow diagram for identifying differences between versions of a video content based on audio data. The device, which may be the device 202 described above, receives audio data of different versions of a video content, illustrated as 1402. ASR processing is performed on the audio data transforming the audio data into resulting text data, illustrated as 1404. The text data of the different versions of the video content may be aligned, for example, based on the time code associated with the different video contents, illustrated as 1406. Portions of the text data of the different versions of the video content that do or do not match are detected, illustrated as 1408. The misalignment or mismatch of the text data of the versions of the video content can be used to identify where scenes have been added or deleted.

In another aspect, the audio data may be processed using audio processing techniques. The resulting audio data of the different versions of the video content may be aligned, for example, based on the time code associated with the different video contents, illustrated as 1410, and the portions of the audio data of the different versions of the video content that do or do not match may be detected, illustrated as 1412. In yet another aspect, the video/image data of different versions of a video content may be processed using the image processing and/or facial recognition techniques described above, and the processed video/image data may be used to detect differences between the versions of the video content. In this aspect, the processed video/image data of the different versions of the video content may be aligned, and portions of the text data of the different versions of the video content that do or do not match may be detected.

Figure 15:
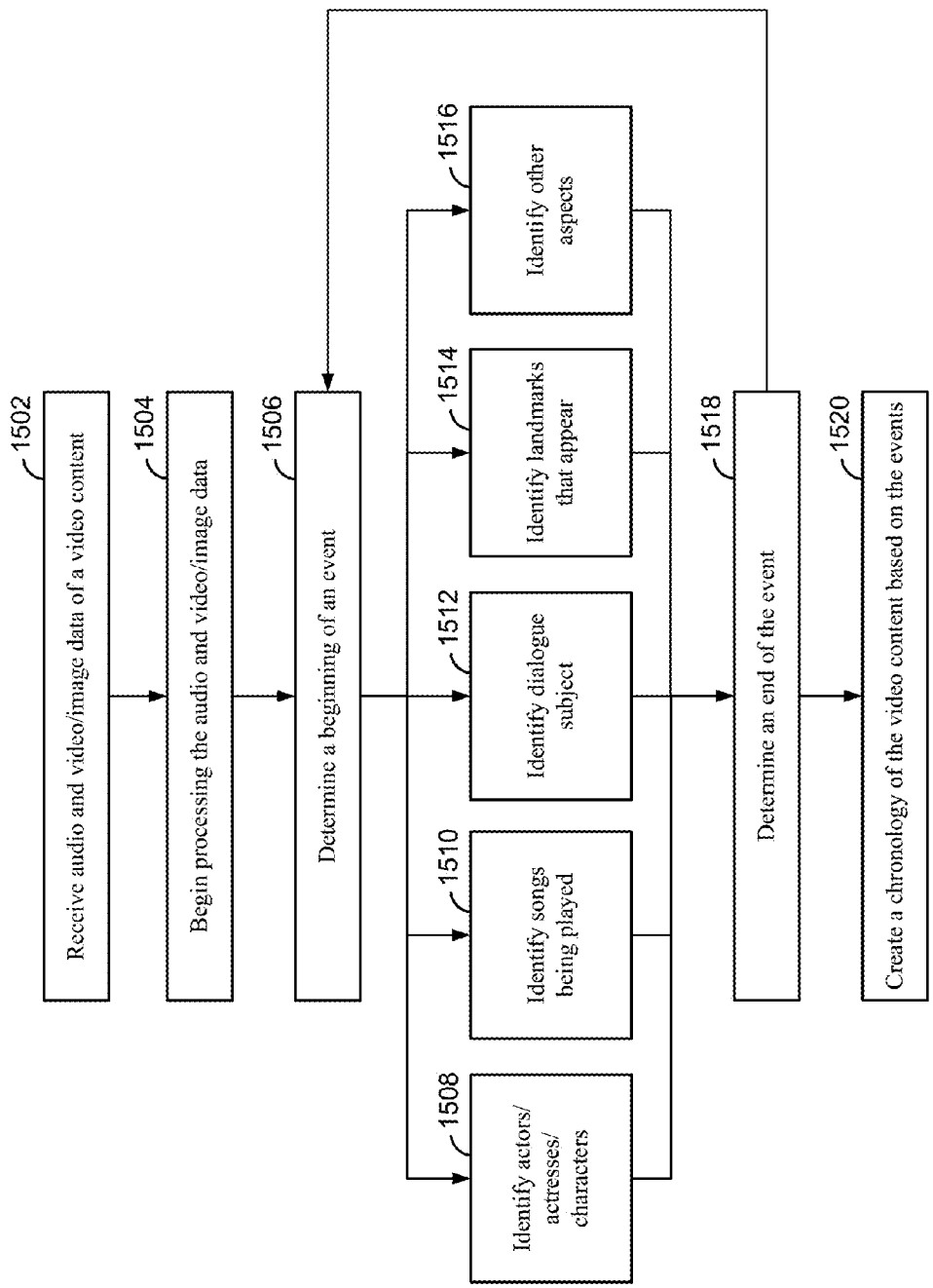
FIG. 15 illustrates a flow diagram for identifying events of a video content according to one aspect of the present disclosure.

In an aspect, the techniques described above may be combined to create the chronology of the video content. FIG. 15 shows a flow diagram for identifying events of a video content and creating a chronology. The device, which may be the device 202 described above, receives audio data and video/image data of a video content, illustrated as 1502. Processing of the audio and the video/image data begins using one or more of the audio processing, signal processing, speaker identification techniques, ASR processing, NLU processing, image processing and facial recognition techniques described above, illustrated as 1504. A beginning of an event of the video content is determined, illustrated as 1506. For example, the beginning of the event may occur at a time of the video content, for example a first event may begin at a time zero [0:00:00:00] of the video content.

During the processing of the audio data and video/image data actors, actresses, and/or characters may be identified, illustrated as 1508. Songs being played may be identified, illustrated as 1510. A dialogue subject between the actors, actresses, and/or characters may be identified, illustrated as 1512. Landmarks of a setting of the video content may be identified, illustrated as 1514, and other aspects, such as those described above or otherwise, may be identified, illustrated as 1516.

An end of the event may be determined, illustrated as 1518, for example, the end of the event may occur at a time of the video content, for example a first event may end at a time of two minutes [0:02:00:00] into the video content. An event may be a time bracketed duration of time a certain actor, actress, or character appears in the video content, for example, the event may begin when the actor, actress, or character first appears on screen and end when the actor, actress, or character goes off screen. Another event may be a time bracketed duration of time a certain song is playing in the video content. Another event may be a time bracketed duration of time a certain dialog subject is being present in the video content. Yet other events, may correspond to time bracketed durations of time one or more other aspects occur in the video content.

As illustrated in FIG. 15, upon determination of an end of an event, illustrated as 1518, the process may loop back and determine a beginning of another event and repeat the steps, until the entire video content has been processed. In this respect, numerous events may be identified, classified, and tagged using the processed described herein. These events may overlap one another, for example, a first character A may appear on screen at a time of ten minutes five seconds [0:10:05:00] and go off screen at a time of eleven minutes twenty five seconds [0:11:25:00], while a second character B may appear on screen at a time of ten minutes fifteen seconds [0:10:15:00] and go off screen at a time of eleven minutes five seconds [0:11:05:00].

The events may then be compiled together to create a chronology of the video content, illustrated as 1520. The chronology may be a compilation of the identified, classified, and tagged events resulting in enhanced data that may be used to annotate the video content to enhance a user's enjoyment of the video content.

In an aspect, data related to a video content may be obtained via crowd sourcing. In this aspect, individuals may have information that can be used to annotate the video content, for example, such information may include information that relates to the filming location of the portions of the video content, how the actors and actresses worked together, what actors and actresses did prior to or in preparation for filming of portions of the video content, how many takes a scene took, and other similar data. In one aspect, the user may provide input to the system while watching video content. For example, a user may provide input to the system through a device displaying the video content or a supplemental device (such as a tablet, phone, etc.) to add to the enhanced data regarding the video content. User provided data may include information regarding a particular scene (actor, actress, filming location, etc.), a user preference (such as a favorite scene, soundtrack, etc.), or other information. The user provided data may be incorporated into the system's general information regarding the video content and/or may be stored as data specifically associated with the particular user for later application(s).

Figure 16:
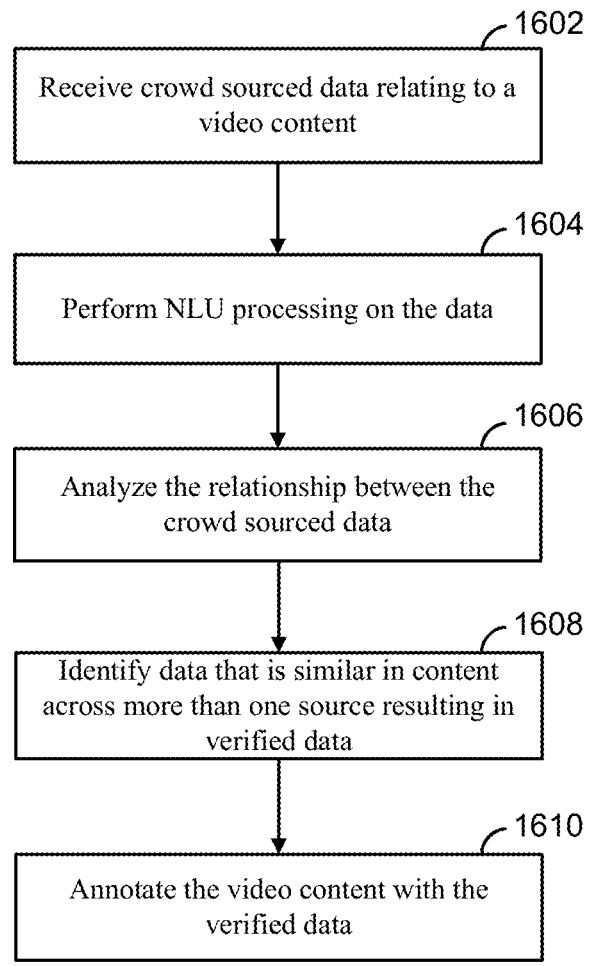
FIG. 16 illustrates a flow diagram for analyzing crowd sourced data relating to a video content according to one aspect of the present disclosure.

In this aspect, NLU processing can be used to classify the reliability of such crowd sourced data. FIG. 16 shows a flow diagram for analyzing crowd sourced data. Crowd sourced data relating to a video content is received, illustrated as 1602. NLU processing is performed on the crowd sourced data, illustrated as 1604. The relationship between the crowd sourced data is analyzed illustrated as 1606, to identify data that is similar in content across more than one of the sources of the crowd sourced data, illustrated as 1608. The portions of data that include similarities in content may be identified as verified data. For example, more than one source of the crowd sourced data may relate to a filming location and identify the same location. By determining that more than one source has identified the same filming location, the identification of the filming location identified may be more reliable. The verified data may then be incorporated into the chronology and used to annotate the video content, illustrated as 1610.

The enhanced data generated by the techniques described herein may be time coded with the moment or portion of time within the video content that the data relates to. For example, in identifying the character, actor, actress, or person in the video content, the moment or portion of time within the video content that the character, actor, actress, or person appears in the video content may be tagged or time coded with the identity of the character, actor, actress, or person. The results of the image processing may also be time coded with the moment or portion of time within the video content that the items, products, and/or expressions and positions appear or occur within the video content. Similarly, the moment or portion of time within the video content when an identified song is playing may be tagged or time coded with the identity of the song.

In an aspect, the enhanced data or enhanced data described above may be used to enhance or annotate a video content and create a chronology of the video content. A user may download or stream a video content from a server to a client device, and the enhanced data or chronology may be sent along with the video content. In one aspect, the client device may be a general-purpose computing system, server-client computing system, mainframe computing system, telephone computing system, laptop computer, cellular phone, personal digital assistant (PDA), tablet computer, and other mobile devices.

A user interface may be rendered on the client device to present relevant enhanced data from the collection of enhanced data that has been sent. For example, upon pausing of the video content, the user interface may be rendered that displays headshots, names, and character names for all cast members who perform in the current scene of the video content. The user interface may also present the filming location, quotations, parental guide rating, or other information related to the current scene. A user may select one of the cast members, or item that appears in the video content through the user interface, and the user interface may be present additional information about the selected cast member or item. For example, the user interface may present biographical information for the cast member and to list related video content, e.g., other video content in which the selected cast member performs. In another example, the user interface may present make and model information of an automobile that is selected and other information about the selected automobile.

In an aspect, the user interface may include a timeline component that represents the video content and visually segments or divides the video content into scenes. The timeline component may visually indicate the current scene, bookmarked scenes, favorite scenes that are popular with a group of users, and/or other scenes. Where a cast member is currently selected, the timeline component may visually indicate the scenes of the video content in which the cast member performs. Further, a user may use the timeline component to preview other scenes or to jump to other scenes.

In an aspect, the user interface may allow the user to search for content within the video content. For example, the user may desire to see all of the scenes that include screaming. In this example, the user can enter screaming into the search and the timeline component may visually indicate the scenes of the video content in which screaming occurs. In another example, the user interface may present the user with a rating guide of the video content, that identifies, for example, scenes that contain nudity, blood, death, obscene language, and other aspects or events. In this regard, the user interface may allow the user to skip or block selected scenes, or preview or jump to selected scenes.

In another aspect, the user interface may present pop-up content to the user during certain portions of the video content. For example, if an actor disliked working with another actor or actress in one scene, the user interface may present a pop-up that informs the user that in this scene, actor X disliked working with actor Y. In another example, if the user is viewing a director's cut version of the video content and a certain scene was removed in the theatrical version, the user interface may present a pop-up that informs the user that this scene was removed in the theatrical version, and the pop-up may also include an explanation of why the scene was removed.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the techniques described herein may be applied to many different languages and types of media and video content. Persons having ordinary skill in the field of computers, digital imaging, and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the present disclosure may be implemented within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A method for analyzing video content, comprising:
receiving, from a first user device, audio data corresponding to the video content, wherein the video content is being played on a second user device different than the first user device;
performing speech recognition on the audio data resulting in text data corresponding to the audio data;
performing natural language understanding on the text data to obtain first information;
performing audio processing on the audio data to obtain second information;
identifying an event of the video content based at least in part on the text data, the first information, and the second information;
determining information about the event of the video content; and
presenting, on the first user device, the information about the event proximate to the event to a user while the user is watching the video content on the second user device.

2. The method of claim 1, wherein the first event comprises an appearance of an actor, an actress, or a character in the video content based at least in part on one or more of the text data, the first information, and the second information.

3. The method of claim 1, further comprising processing the audio data using one or more speaker specific recognition models to identify an actor, an actress, or a character in the video content.

4. The method of claim 1, wherein the event is selected from a group consisting of a filming location appearing in the video content, an actor appearing in the video content, an actress appearing in the video content, a character appearing in the video content, a scene of the video content, a song playing in the video content, a topic of dialogue in the video content, an action performed in the video content, a facial expression appearing in the video content, an emotion portrayed in the video content, and an item or product that occurs or is displayed in the video content.

5. The method of claim 1, wherein the event includes a landmark.

6. The method of claim 1, wherein the information about the event comprises information about a dialogue subject.

7. A computing device, comprising:
at least one processor;
a memory device including instructions operable to be executed by the at least one processor to perform a set of actions, configuring the processor:
to receive, from a first user device, audio data corresponding to a video content playing on a second user device different than the first user device;
to perform speech recognition on the audio data resulting in text data corresponding to the audio data;
to perform natural language understanding on the text data to obtain first information;
to identify events of the video content based on at least one of the text data and the first information; and
to cause information corresponding to an event to be presented by the first user device to a user during occurrence of the event while the user is watching the video content on the second user device.

8. The computing device of claim 7, wherein the processor is further configured to identify scenes of the video content based on dialogue subjects of the video content.

9. The computing device of claim 7, wherein the processor is further configured to receive image data corresponding to the video content and to perform image processing on the image data to obtain second information.

10. The computing device of claim 9, wherein the processor is further configured to identify the events of the video content based on at least one of the text data, the first information, and the second information.

11. The computing device of claim 10, wherein the events comprise one or more of a dialogue subject of at least a portion of the video content, a setting displayed during at least a portion of the video content, a song played during at least a portion of the video content, a landmark displayed during at least a portion of the video content, an actor appearing in at least a portion of the video content, an actress appearing in at least a portion of the video content, a character appearing in at least a portion of the video content, a scene of at least a portion of the video content, an action performed in at least a portion of the video content, a facial expression appearing in at least a portion of the video content, and an emotion portrayed in at least a portion of the video content.

12. The computing device of claim 7, wherein the identifying the events of the video content includes determining a beginning time of an event and an end time of an event.

13. The computing device of claim 7, wherein the processor is further configured:
to receive events of a second version of the video content; and
to compare the identified events of the video content to the received events of the second version of the video content.

14. The computing device of claim 7, wherein the processor is further configured to identify an actor, an actress, or a character of the video content based on at least one of the text data and the first information.

15. The computing device of claim 7, wherein the processor is further configured to:
process the audio data using one or more speaker specific recognition models, and
identify an actor, an actress, or a character who is speaking during at least a portion of the video content based at least in part on the processed audio data.

16. The computing device of claim 7, wherein the processor is further configured to cause the information corresponding to the event to be presented by the first user device by providing an audio output to the first user device.

17. The computing device of claim 7, wherein the processor is further configured to cause the information corresponding to the event to be presented using a visual output on a third user device.

18. A non-transitory computer-readable storage medium storing processor-executable instructions for controlling a computing device, comprising:

program code to receive, from a first user device, audio data corresponding to a video content playing on a second user device different than the first user device;

program code to perform speech recognition on the audio data resulting in text data corresponding to the audio data;

program code to perform natural language understanding on the text data to obtain first information;

program code to identify events of the video content based on at least one of the text data and the first information and program code to cause information corresponding to an event to be presented by the first user device to a user during occurrence of the event while the user is watching the video content on the second user device.

19. The non-transitory computer-readable storage medium of claim 18, further comprising program code to identify scenes of the video content based on dialogue subjects of the video content.

20. The non-transitory computer-readable storage medium of claim 18, further comprising:

program code to receive image data corresponding to the video content, and program code to perform image processing on the image data to obtain second information.

21. The non-transitory computer-readable storage medium of claim 20, further comprising program code to identify the events of the video content based on at least one of the text data, the first information, and the second information.

22. The non-transitory computer-readable storage medium of claim 21, wherein the events comprise one or more of a dialogue subject of at least a portion of the video content, a setting displayed during at least a portion of the video content, a song played during at least a portion of the video content, a landmark displayed during at least a portion of the video content, an actor appearing in at least a portion of the video content, an actress appearing in at least a portion of the video content, a character appearing in at least a portion of the video content, a scene of at least a portion of the video content, an action performed in at least a portion of the video content, a facial expression appearing in at least a portion of the video content, and an emotion portrayed in at least a portion of the video content.

23. The non-transitory computer-readable storage medium of claim 18, further comprising:

program code to receive events of a second version of the video content; and program code to compare the identified events of the video content to the received events of the second version of the video content.

24. The non-transitory computer-readable storage medium of claim 18, further comprising program code to identify an actor, an actress, or a character of the video content based on at least one of the text data and the first information.

25. The non-transitory computer-readable storage medium of claim 18, further comprising:

program code to process the audio data using one or more speaker specific recognition models, and program code to identify an actor, an actress, or a character who is speaking during at least a portion of the video content based at least in part on the processed audio data.

26. The non-transitory computer-readable storage medium of claim 18, wherein the program code to identify the events includes program code to determine a beginning time of an event and an end time of an event.

* * * * *